(12) United States Patent
Strömberg

(10) Patent No.: US 8,533,965 B2
(45) Date of Patent: Sep. 17, 2013

(54) DEVICE AND METHOD FOR MEASURING AND ALIGNING A FIRST COMPONENT AND A SECOND COMPONENT IN RELATION TO EACH OTHER

(75) Inventor: Peter Strömberg, Göteborg (SE)

(73) Assignee: Elos Fixturlaser AB, Mölndal (SE)

( * ) Notice: Subject to any disclaimer, the term of this patent is extended or adjusted under 35 U.S.C. 154(b) by 196 days.

(21) Appl. No.: 13/123,517

(22) PCT Filed: Oct. 8, 2009

(86) PCT No.: PCT/SE2009/051120
§ 371 (c)(1),
(2), (4) Date: Apr. 8, 2011

(87) PCT Pub. No.: WO2010/042039
PCT Pub. Date: Apr. 15, 2010

(65) Prior Publication Data
US 2011/0194103 A1  Aug. 11, 2011

(30) Foreign Application Priority Data
Oct. 10, 2008  (SE) ..................................... 0802167

(51) Int. Cl.
*G01B 11/27* (2006.01)
(52) U.S. Cl.
USPC ........................................................... 33/412
(58) Field of Classification Search
USPC ............................. 33/412, 529, 286; 382/151
See application file for complete search history.

(56) References Cited

U.S. PATENT DOCUMENTS

| 2,638,676 A | * | 5/1953 | Callahan | 33/412 |
| 2,656,607 A | * | 10/1953 | Harding | 33/412 |
| 3,604,121 A | * | 9/1971 | Hull | 33/657 |

(Continued)

FOREIGN PATENT DOCUMENTS

| DE | 4041723 A1 | 6/1992 |
| EP | 1336817 A2 | 8/2003 |

OTHER PUBLICATIONS

International Preliminary Report on Patenetability received for PCT Patent Application No. PCT/SE2009/051120, mailed on Oct. 22, 2010, 6 pages.

(Continued)

*Primary Examiner* — Christopher Fulton
(74) *Attorney, Agent, or Firm* — Morrison & Foerster LLP

(57) ABSTRACT

The invention relates to a device (1) for measuring and alignment of a first component (2, 4) and a second component (3, 5) in relation to each other, where the device comprises a first detector unit (6) disposed to be mounted on the first component (2, 4) and a second detector unit (7) disposed to be mounted on the second component (3, 5) as well as a control unit (12) which is connected to the first detector unit (6) and the second detector unit (7). The device (1) comprises a first geometric pattern (16) disposed on the first detector unit (6) and a second geometric pattern disposed on the second detector unit (7). The position of the first geometric pattern (16) can be detected by the second detector unit (7) and the position of the second geometric pattern can be detected by the first detector unit (6). The invention also relates to a method for aligning a first component (2, 4) and a second component (3, 5).

14 Claims, 3 Drawing Sheets

(56) References Cited

U.S. PATENT DOCUMENTS

| | | | |
|---|---|---|---|
| 4,249,294 A | | 2/1981 | Belfiore |
| 4,413,415 A | * | 11/1983 | Stovall ............................ 33/661 |
| 4,518,855 A | | 5/1985 | Malak |
| 4,724,480 A | | 2/1988 | Hecker et al. |
| 5,077,905 A | | 1/1992 | Murray |
| 5,715,609 A | | 2/1998 | Nower |
| 5,980,094 A | * | 11/1999 | Nower ............................ 700/279 |
| 6,031,616 A | | 2/2000 | Seiffert |
| 6,040,903 A | * | 3/2000 | Lysen et al. ................... 356/153 |
| 6,098,297 A | | 8/2000 | Belfiore |
| 6,931,738 B2 | * | 8/2005 | Bodgren et al. ................. 33/286 |
| 7,174,649 B1 | * | 2/2007 | Harris ............................. 33/412 |
| 7,312,871 B2 | | 12/2007 | Henry |
| 2002/0152622 A1 | | 10/2002 | Granger |

OTHER PUBLICATIONS

International Search Report received for PCT Patent Application No. PCT/SE2009/051120, mailed on Jan. 11, 2010, 5 pages.

\* cited by examiner

DEVICE AND METHOD FOR MEASURING AND ALIGNING A FIRST COMPONENT AND A SECOND COMPONENT IN RELATION TO EACH OTHER

CROSS REFERENCE TO RELATED APPLICATIONS

This application is a U.S. National Phase patent application of PCT/SE2009/051120, filed Oct. 8, 2009, which claims priority to Swedish patent application Serial No. 0802167-7, filed Oct. 10, 2008, all of which are hereby incorporated by reference in the present disclosure in their entirety.

TECHNICAL FIELD

The present invention relates to a device for measuring and aligning a first component and a second component in relation to each other, where the device comprises a first detector unit arranged to be mounted on the first component and a second detector unit arranged to be mounted on the second component, and a control unit which is connected to the first detector unit and the second detector unit.

The invention also relates to a method of measuring and aligning of a first component and a second component in a predetermined relation to each other, where the method comprises the steps of mounting a first detector unit on the first component, mounting a second detector unit on the second component and connecting a control unit to the first detector unit and the second detector unit.

BACKGROUND ART

In various technical contexts there is a need for correct alignment of various components in relation to each other. In connection with the operation of large machines for example ventilation devices, pumps and similar plants the output power from a driving unit (e.g. a motor) is transmitted to a driven unit (e.g. a pump). This takes place via a rotational movement of the output shaft in the driving unit which transmits power to an input shaft in the driven unit.

In the operation of large motors, pumps and the like it is extremely important that the output shaft of the driven unit be correctly aligned relative to the input shaft of the driven unit. In this way, the output power from the driving unit can be transmitted optimally to the driven unit. Any misalignment of the two shafts in relation to each other can result in poor efficiency and increased risk of wear and damage to the various component parts.

Within this technical area there is therefore a need for correct and exact alignment of the output shaft in relation to the input shaft. In this context it can be noted that the two shafts can have alignment errors which are essentially of two different types. Most specifically, the shafts can be positioned so that they are placed at a relative angle to each other, corresponding to a horizontal or vertical angular error, or they can be positioned so that they are displaced in parallel to each other. The latter case corresponds to a situation where the shafts are placed in parallel to each other but somewhat displaced laterally relative to each other. This is usually called a horizontal or vertical offset error.

If these errors exceed predetermined threshold values, it can be assumed that the shafts are misaligned relative to each other. In such a situation, an operator can correct this by mechanically adjusting the physical position of one of the units or both of the units to eliminate the misalignment. Usually the position of one of the shafts is taken as a reference against which the other shaft is aligned.

Consequently, within the technical area in question, there is a need for systems and methods for correct alignment of various types of components including rotating shafts. Such systems and methods can be used for motors, pumps, ventilation systems, generators, paper making machines and in various other areas. In particular, these types of systems for alignment can be used in applications involving shafts rotating at high speed or in technical areas involving expensive and sensitive equipment where there is a great need to minimize unnecessary wear and the risk of breakdowns as a result of incorrect alignment of the shafts.

In the prior art it can be seen that a first shaft and a second shaft can be aligned by using an arrangement comprising a detector unit mounted on the first shaft and an additional detector unit mounted on the second shaft. Such an arrangement is shown in U.S. Pat. No. 4,518,855, which describes a first measuring device which is mounted on a first shaft and a second measuring device mounted on a second shaft. The first measuring device is provided with a first light source which is directed towards the second measuring device, while the second measuring device is provided with a second light source which is directed towards the first measuring device. The light sources are suitably laser light sources. The respective measuring device is disposed to detect the position of the light beam coming from the opposite device. During the measuring procedure, the shafts must rotate, in accordance with this known technology, so that the relative movements of the shafts at the various rotational positions can be detected. The information on the relative movement when measuring at various rotational positions provides information on the change of position of the respective shaft. This provides information on any misalignment of the two shafts.

U.S. Pat. No. 5,077,905 shows a device for alignment of two rotating shafts with the aid of measuring devices which are based on laser light sources and are disposed in connection with the respective rotating shaft.

Despite the fact that there are previously known devices and methods for alignment of rotating shafts, there is a continued need for improvement, particularly for achieving, if possible, an ever more precise measuring procedure which is simply implemented and at low cost.

The above type of measuring equipment is intended to be used when the relevant machines are standing still, i.e. when they are relatively cold and not in use for the moment.

It should however be noted that for many applications, the alignment between a motor and a pump can be changed when these machines are started and driven and gradually become warmed-up, i.e. they go from a cold and shut-off state to a state corresponding to normal operation. The alignment can for example vary depending on the operating temperature of the machines. The alignment can also vary depending on changes in the operating pressure (if the alignment is performed on a pump or a compressor). Furthermore, pipe load on the shafts can cause changes in the alignment between the cold and warm operating states.

The change in the alignment between a cold and a warm operating state can also be affected if the relevant machines are driven in parallel, or if changes in electric load or rotational forces occur during operation.

Thus there are thermal factors and other parameters which affect the alignment of the machines. As was described above, there is in particular a problem that correct alignment of a machine standing still does not necessarily correspond to a correct alignment of the same machine when it is in operation. This means that it will be necessary to perform some corrections to compensate for the fact that changes in alignment will occur between a cold and a warm state.

A previously known system for measuring the distance in alignment from a cold operating state to a warm operating state is manufactured by the company Prüftechnik and comprises two units made of combined transmitters and detectors intended to be mounted on a first stationary machine, suitably on a bearing housing of said first machine. The transmitters comprise laser light sources. Cooperating prisms are mounted on a second, portable machine which is intended to be adjusted so that corrected alignment is obtained.

Another known system is shown in U.S. Pat. No. 7,312, 871, where a special fixture for rotation makes possible measurement of the difference in alignment between two operating states, both horizontally and vertically with a single-axis measuring system.

DESCRIPTION OF THE INVENTION

One primary purpose of the present invention is thus to provide an improved method and arrangement for alignment of a first component and a second component in relation to each other, especially to achieve a high precision in measurement, cost-effective measurements and simple handling for an operator.

The above purposes are achieved with a device of the type described by way of introduction, which further comprises a first geometric pattern disposed on the first detector unit and a second geometric pattern disposed on the second detector unit, the position of the first geometric pattern being detectable by the second detector unit and the position of the second geometric pattern being detectable by the first detector unit.

The purpose is also achieved with a method of the type described by way of introduction, which comprises the steps of mounting a first geometric pattern on the first detector unit, mounting a second geometric pattern on the second detector unit, so that the position of the first geometric pattern is detected by the second detector unit and the position of the second geometric pattern is detected by the first detector unit, and detecting and analyzing of the geometric properties of the respective patterns.

The invention provides certain significant advantages over the prior art. Primarily, it can be noted that the invention results in a simple, effective and easily monitored process for alignment of shafts, since an easily operated and cost-effective camera unit can be used in the respective detector unit. When comparing with the prior art, the present invention provides a simplification, since the respective detector unit only comprises one alignment component, i.e. in the form of a single camera unit. This contrasts with the prior art where the respective detector unit must be provided with two components, specifically a laser transmitter and a photo-sensitive sensor.

Furthermore, the invention has an advantage—as compared with the prior art—in that it is not based on sending a light ray. Instead, the measurement values in the alignment process are obtained by images with the aid of the respective camera unit.

The device according to the invention is also particularly easily used since the respective detector unit in practice does not need any form of initial rough alignment for measurement, which can be the case in the system based on the prior art in the form of traditional laser-based measuring systems.

An additional advantage of the invention over previously known single-access detectors (for laser light) is that the present invention provides two-axis, i.e. two-dimensional measurement. This means that the positional changes of the shafts can be detected in two dimensions, which facilitates the alignment of the machines after the measurements. In principle, two-axis measurement is possible with known technologies, but requires more expensive detectors. The present invention solves this problem in a cost-effective manner.

An additional advantage of the invention is that it can measure, in a simple and cost-effective manner, positional changes for machines between a cold and a warm operating state. By mounting the detectors on the machine housing in connection to the shafts, angular and offset changes both horizontally and vertically can be measured. These changes can be used during alignment of the machines in the cold state to compensate for the movements which arise during the transition to the operating state, so that the alignment is correct during the warm operating state.

DESCRIPTION OF THE DRAWINGS

The invention will be described below with reference to preferred embodiments and the accompanying drawings, where.

PREFERRED EMBODIMENT

Figure 1:
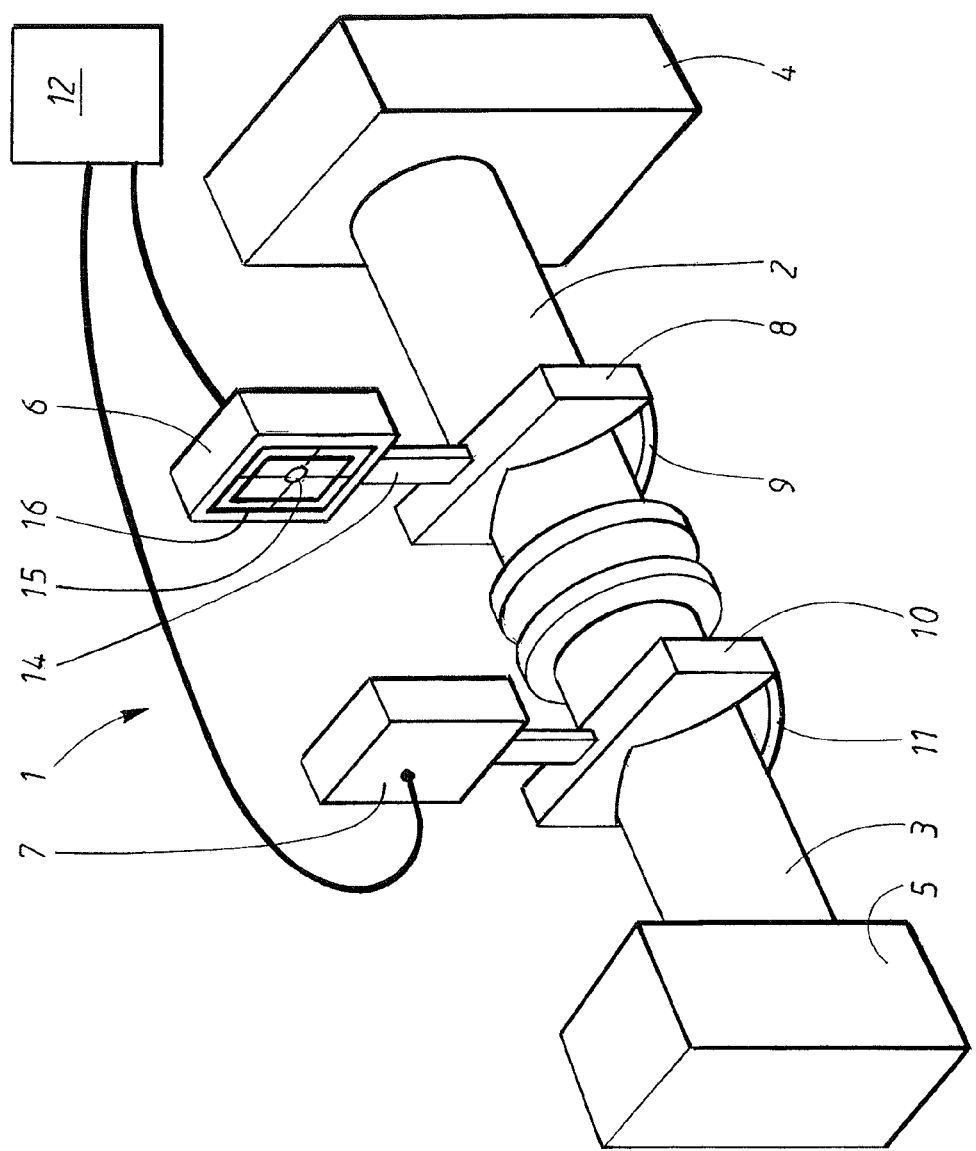
FIG. 1 is a perspective view of an arrangement disposed in accordance with the preferred embodiment of the present invention.

FIG. 1 is a schematic and somewhat simplified perspective view of a device 1 according to the present invention. The invention is particularly, but not exclusively, intended to be used for alignment of two rotating shafts 2, 3. According to one embodiment of the invention, the first rotating shaft 2 can be a portion of a driving unit 4, which can be for example a motor, while the second rotating shaft 3 can be a part of a driven unit 5, which can be for example a pump or a fan installation, generally, it can be said that the invention can be used in various types of power transmission from a driving to a driven unit where the power is transmitted by rotating shafts, such as for example various types of machines or motor units. It should also be noted that the invention is not only of use in those cases where power transmission occurs, but can also be used in general in all types of applications where shafts must be aligned co-linearly.

In FIG. 1, the driving unit 4 and the driven unit 5 are illustrated in a simplified schematic manner. For reasons described above, the driving unit 4 and the driven unit 5 are disposed so that the two shafts 2, 3 are aligned essentially co-linearly in relation to each other, i.e. so that they are oriented along a common imaginary line. The purpose of this is to see to it that any alignment error, such as angular error or offset error between the shafts 2, 3 can be minimized as much as possible. This makes possible, in turn, transmission from the driving unit 4 to the driven unit 5 without unnecessary power loss and with minimum risk for wear and breakdown.

For alignment of the two shafts 2, 3 in relation to each other, a first detector unit 6 and a second detector unit 7 are used. The first detector unit 6 is, during use, intended to be mounted on the first shaft 2, while the second detector unit 7 during use is intended to be mounted on a second shaft 3. According to the embodiment shown in FIG. 1, the two detector units 6, 7 are of essentially the same construction and function. The first detector unit 6 is suitably fixed to the first shaft 2 with the aid of a so-called V-block 8 with an associated tightening belt 9, while the second detector unit 7 can be fixed to the second shaft 3 with the aid of a additional V-block 10 with a tightening belt 11. One important reason for the two detector units 6, 7 being set up in the opposing manner shown in FIG. 1 is that it is desirable to distinguish between angular errors and offset errors during measurement.

Furthermore, the two detector units 6, 7 are connected to a computer-based control unit 12, which is disposed for controlling and measuring of any alignment errors with the aid of detector units 6, 7 in a manner which will be described below. The first detector unit 6 will now be described in more detail with reference to FIG. 2.

Figure 2:
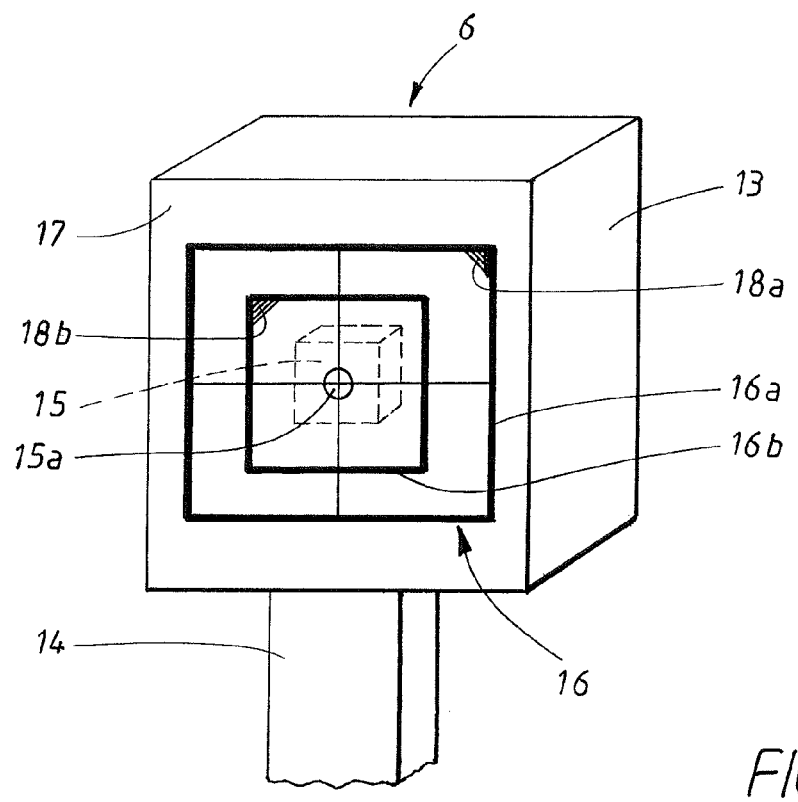
FIG. 2 is a somewhat enlarged perspective view of a detector unit in a device in accordance with the present invention.

FIG. 2 is an enlarged perspective view of the first detector unit 6, which comprises a housing 13 and mounting device 14, which during use connects the housing 13 to the corresponding V-block 8 (see FIG. 1). Furthermore, it is a principle of the invention that the housing 13 houses an image registration device, preferably in the form of a camera unit 15. This camera unit 15 is largely hidden inside the housing 13 (which is indicated with the dash lines in FIG. 2), and comprises an image sensor 15a with a lens facing towards the other detector unit 7. The second detector unit 7 is in principle identical with the first detector unit 6 and comprises as well an image-registering device in the form of a camera unit (as shown in the figures) with an additional image sensor with a lens which faces towards the first detector unit 6.

The housing 13 of the first detector unit 6 is furthermore provided with a first geometric pattern 16, i.e. a type of a target for detecting with the aid of the opposing (i.e. mounted on the second detector unit 7) camera unit. The first geometric pattern 16 can be made in various manners, but according to the embodiment consists of a cross with two squares 16a and 16b of differing sizes which are disposed by printing, embossing or with the aid of decals or the like on a frontal surface 17 of the housing 13 which, during use, faces towards the second detector unit 7.

The purpose of the first geometric pattern 16 is to be able to be detected with the aid of the first detector unit 7, more particularly by optical detection with the aid of the camera unit disposed on the second detector unit 7. It should be noted here that the camera unit 15 is preferably mounted at a predefined centerpoint on a front surface 17 of the detector unit 6. The corresponding relationship applies to the camera unit mounted on the second detector unit 6.

During detection with the invention, it is preferably the physical position of the respective pattern 16, and its changes in position, which are detected by the respective opposite camera unit 15. More particularly, the detected position of the pattern 16 corresponds to a surface of the image sensor of the opposite camera unit 15, which is filled (completely or partially) by the detected image of the opposite pattern 16. The change in this detected position is measured between various rotational positions which the detector units 6, 7 are put in during the measurement. This procedure with setting the detector units 6, 7 at various rotational positions is done in accordance with known technology and therefore not described in detail here.

Even though not shown in the figures, it can be noted that the second detector unit 7 carries an identical geometric pattern on a side surface facing the first detector unit 6. This second geometric pattern on the second detector unit 7 constitutes—in the same manner as the first geometric pattern 16—a target for detection with the aid of the opposite, first detector unit 6. Thus the embodiment is disposed so that the first detector unit 6 is arranged to detect the geometric pattern on the second detector unit 7 while the second detector unit 7 is disposed to detect the geometric pattern 16 of the first detector unit 6.

The patterns on the respective detector unit 6, 7 are preferably arranged so that they follow the geometric shape of the opposite image surface of the respective camera unit 15. Suitably, the image surface can be of rectangular shape, i.e. according to the so-called 4:3 format, which means that the respective geometric pattern 16 on the detector units 6, 7 can have a similar shape. The invention is however not limited to this embodiment but other geometric shapes, i.e. square (as shown with reference to the figures) or circular are also possible within the scope of the invention.

With reference to FIG. 1, it can be noted that the two different squares 16a, 16b can suitably be provided with some form of marking, for example in form of two relatively small corner triangles 18a, 18b, which are marked in various positions on the respective squares 16a, 16b. The purpose of this is to make possible to distinguish between the two squares 16a, 16b during detection with the respective opposite camera unit.

The two camera units have a predefined image surface. When detecting and image registration of the respective opposite geometric pattern, an image of this geometric pattern will be registered in the respective camera unit. In a first case, it is assumed that the position for the respective outer square 16a is detected.

The two detected images will give a relative position for the geometric pattern in relation to the opposite detector unit. This procedure is repeated at at least three different rotational positions of the shafts 2, 3. This means that, for each of these rotational positions, information is obtained concerning a relative displacement of the respective pattern, which in turn provides the positions of the shafts 2, 3 relative to each other, presupposing that measurements are made at the three different rotational positions. It should be noted that in certain applications, for example for low precision tolerances, it is sufficient with two different positions at different rotational positions.

Furthermore, with the aid of one camera unit, a measure can be obtained of the distance from the detector unit to the opposite detector unit. This distance measure can provide a measure of how large a proportion of the camera unit image surface is covered by the outer square, i.e. where a certain distance corresponds to how much of a certain square fills the image surface. This measure is in proportion to the distance between the two detector units 6, 7.

Alternatively, the distance measurement can be made by using both the detector units 6, 7 to estimate a distance and then compute an average value.

With the aid of the measured value of the positions of the shafts 2, 3 in the three rotational positions with respect to the relative positions of the patterns and the value of the distance between the two detector units 6, 7, the control unit 8 can compute the position of the first shaft 2 in relation to the second shaft 3. If the shafts 2, 3 are then positioned relative to each other in such a manner that there is an angular error or an offset error that is greater than what has been predefined as permissible, the control unit 8 will signal this, suitably by representing measurement data on a screen (not shown) on the control unit 8. An operator can then, with the guidance of such displayed measurement data, adjust mechanically the position of the unit comprising the first shaft 2 (alternatively the second shaft 3). In this manner any angular or offset error can be reduced.

In accordance with what can be seen in FIG. 2, the first geometric pattern 12 comprises a first square 16a and a second square 16b. The second square 16b is in this embodiment positioned inside the first square 16a. The invention is disposed so that the respective detector unit can detect the first square 16a at a relatively great distance between the detector units 6, 7 and so that the second square 16b is detected at a relatively short distance between the detector units 6, 7. This means that the system provides good resolution for measurements both at relatively long and relatively short distances.

It should be pointed out that the invention provides an advantage in that the distance between the detector units 6, 7 can be computed automatically as described above, i.e. there is no need, as with known technology, to manually measure the distance between the detector units 6, 7 and then feed this information into the system.

Figure 3:
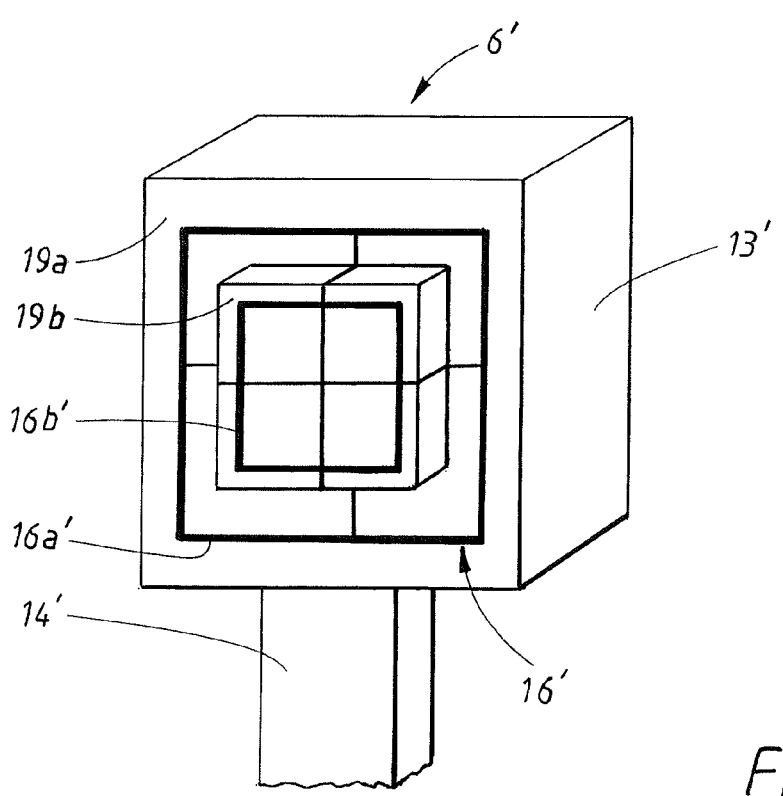
FIG. 3 is a perspective view of a detector unit according to an alternative embodiment.

FIG. 3 shows an alternative embodiment of the invention which consists of an alternative detector unit 6' including a geometric pattern 16' on the housing 13' of the detector unit 6' and which preferably consists of a first square 16a' and a second square 16b'. In this embodiment shown in FIG. 3, a first (alternative) detector unit 6' is used, which only includes a geometric pattern 16', i.e. no camera unit. In the opposite detector unit on the other hand (not shown in the figure), only a camera is used, i.e. no pattern.

The first square 16a' is positioned on a first partial surface 19a of the detector unit 6' while the second, smaller square 16b' is positioned on a second partial surface 19b of the detector unit 6'. The first partial surface 19a is, according to this embodiment, disposed displaced in depth in relation to the second partial surface 19b, i.e. the two partial surfaces 19a, 19b are disposed on two separate planes with different distances to the opposite detector unit. As a result of this arrangement, it is not necessary to use a camera unit in the first detector unit 6' or any geometric pattern in the second detector unit 7'.

Figure 4:
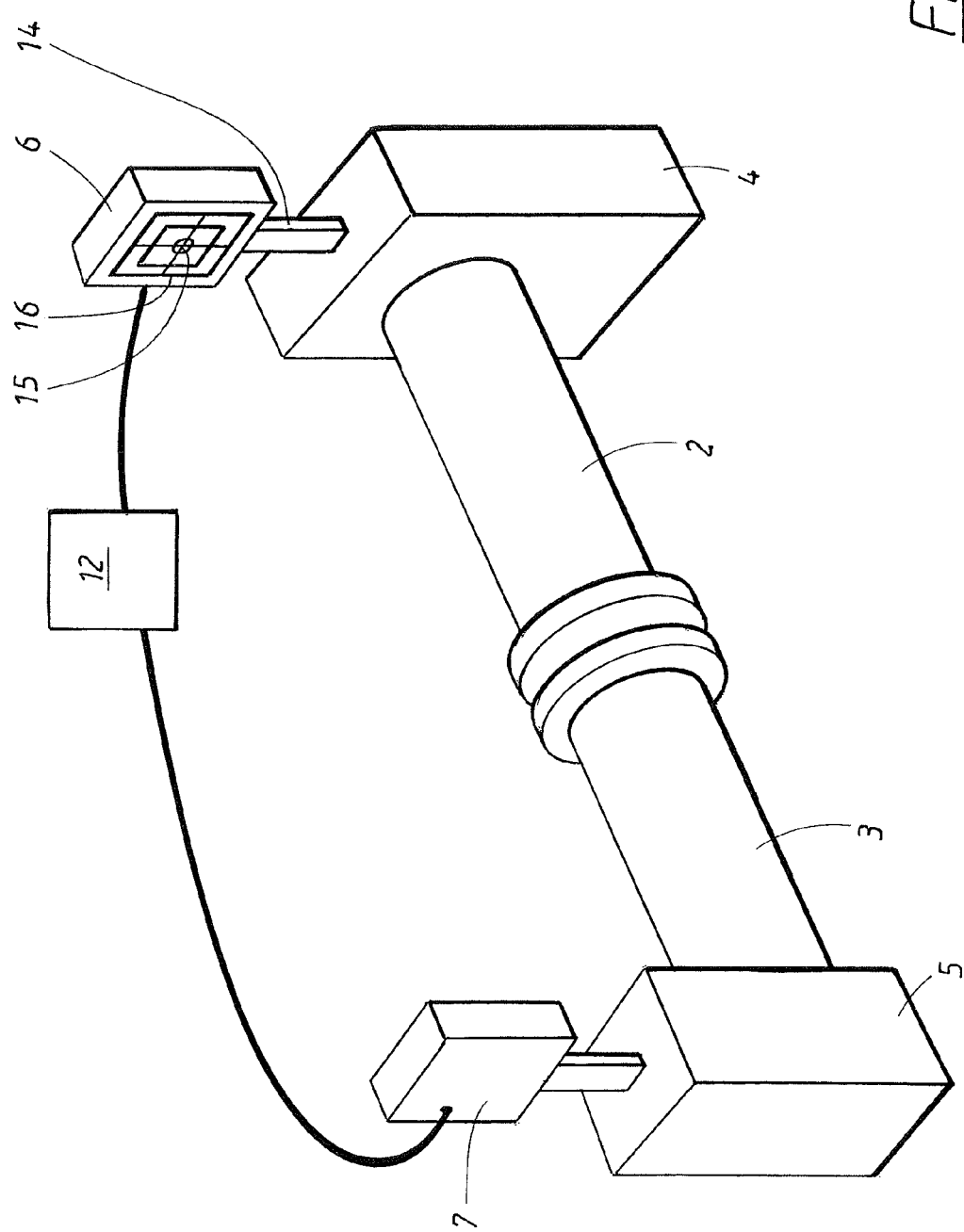
FIG. 4 is a perspective view of an alternative embodiment of the present invention.

FIG. 4 shows a perspective view of a device according to alternative embodiment of the invention. In the figure, components are shown of a similar type as those described above with the same reference numerals as in FIG. 1. Furthermore, the embodiment according to FIG. 4 is intended for those types of measurement which are to be made during operation of the units 4, 5, which suitably are machine or motor components in which the shafts 2, 3 are mounted. The intention is to be able to determine any errors regarding alignment of the shafts 2, 3 as a result of thermal changes during operation, i.e. changes which occur during transition from a cold to a warm operating state (or vice versa) of the units 4, 5. In such a case, the two detector units 6, 7 are preferably mounted directly on, i.e. in mechanical connection with, the respective unit 4, 5. The first detector unit 6 is mounted on the first unit 4 and the second detector unit 7 is mounted on the second unit 5. Otherwise the functioning and construction of the respective detector unit 6, 7 are of the same type as described above with reference to FIG. 1.

One advantage of the arrangement according to FIG. 1 is that the detector units 6, 7 are disposed to simultaneously detect positional changes both horizontally and vertically in the opposite pattern. In this manner it is made possible a computation of how the alignment of the machine components 4, 5 changes both horizontally and vertically. By using the described technology with double opposing units, the changes in both angle (error) and offset (error) can be detected.

The invention is not limited to that described above. Rather, various embodiments are possible within the scope of the patent claims. For example, various types of geometric patterns can be used as well as various types of camera units.

The respective detector units can be disposed in connection to an illumination unit (not shown in the figures) to make the detection and registration with the aid of the camera units as precise as possible. Furthermore, the respective detector unit can be provided with chromatic filters to block sunlight, reflections etc. and to increase the robustness and user-friendliness of the device, which is of importance especially in a industrial environment.

The respective camera unit can suitably be provided with zoom lenses, which is suitable in those cases where measurement occurs at a relative long distance between the detector units. As an alternative, replaceable fixed lenses with various focal length can be used in a respective camera unit.

According to an alternative embodiment, the respective camera unit can be positioned at another position than in a center of the geometric pattern, as shown in the figures. For example, the respective camera unit can be placed outside the pattern.

The image processing, which is required to compute any angular and offset errors based on the measurements with the detector units, can be done online, i.e. in real time, alternatively offline. In the latter case, a control unit is used which has the character of an evaluation unit with the aid of which the measurements are analyzed for computation of any alignment errors.

With the aid of rapid and synchronized image registration units, it is also possible to take measurements at the same time as the shafts rotate.

Furthermore, it can be advantageous to take many measurements during rotation of the shafts to increase accuracy with the aid of averaging and adaptations.

The geometric patterns used are suitably made in such a way as regards colour and other characteristics so that they contribute to a high contrast when detecting with the respective camera unit. In this way the patterns are easily seen during detection.

Finally it is pointed out that the geometric patterns as used are suitably also made in such a manner that the image processing in the computer unit to determine the position of the pattern is facilitated and the known image processing algorithms for these purposes can be used.

The invention claimed is:

1. Device for measuring and aligning a first component and a second component relative to each other, where the first component comprises a first shaft and the second component comprises a second shaft which are intended to be aligned in a predetermined relationship to each other, and where the device comprises a first detector unit disposed to be mounted on the first shaft and a second detector unit disposed to be mounted on the second shaft and a control unit which is connected to the first detector unit and the second detector unit, characterized in that the device further comprises a first geometric pattern disposed on the first detector unit and a second geometric pattern disposed on a second detector unit, the position of the first geometric pattern being detectable by the second detector unit and the position of the second geometric pattern being detectable by the first detector unit, where the device is disposed to detect angular deviations and parallel deviations from the case where the shafts are considered to be aligned with each other, by analyzing with the control unit the detected position of the respective geometric pattern, and where said angular deviations and parallel deviations are detected by measurement of the change in position of said patterns, at least two different axial rotational positions of the shafts.

2. Device according to claim 1, characterized in that the first detector unit and the second detector unit both comprise an image registering device.

3. Device according to claim 2, characterized in that each image registering device comprises a lens and an image sensor.

4. Device according to claim 1, characterized in that each geometric pattern is at least one geometric figure with a periphery, within which periphery a respective image registering device is mounted.

5. Device according to claim 4, characterized in that each geometric figure has a defined midpoint, in which midpoint said image registering device is mounted.

6. Device according to claim 5, characterized in that it is disposed to detect the distance between the measuring units by a detected size of each geometric pattern in relation to an image surface on said image registering device being analyzed in the control unit.

7. Device according to claim 5, characterized in that said geometric patterns are of differing sizes and said image registering unit is disposed for selection of a pattern depending on the distance between the detector units.

8. Device according to claim 1, characterized in that the two geometric patterns are essentially identical to each other.

9. Device according to claim 8, characterized in that at least one of said first and second detector units comprises a zoom function.

10. Device according to claim 1, characterized in that said geometric pattern consists of at least two partial patterns.

11. Device according to claim 10, characterized in that the respective partial patterns are made with distinguishing markings.

12. Device according to claim 1, characterized in that the geometric pattern of the first detector unit comprises a first geometric figure and a second geometric figure which are placed on two different surfaces of the first detector unit which are disposed displaced in depth in relation to each other.

13. Method for measuring and aligning a first component and a second component in a predetermined relationship to each other, where the method comprises alignment of a first shaft of the first component (2, 4) and a second shaft of the second component (3, 5) in a predetermined relationship to each other, where the method comprises the steps of:
   mounting a first detector unit on the first shaft;
   mounting of a second detector unit on the second shaft; and
   connecting a control unit (8) to the first detector unit and the second detector unit, where the method further is characterized in that it comprises the steps of:
   mounting a first geometric pattern on the first detector unit;
   mounting of a second geometric pattern on the second detector unit, so that the position of the first geometric pattern can be detected by the second detector unit and the position of the second detector unit can be detected by the first detector unit; and
   detecting and analyzing of the geometric characteristics of the respective geometric patterns,
   detecting angular deviations and parallel deviations from the case where the shafts are considered to be aligned with each other by analyzing the detected position of each geometric pattern, and by measuring the change in position of said geometric patterns between at least two different axial rotational positions of the shafts.

14. Method according to claim 13, characterized in that the distance between the first detector unit and the second geometric pattern and the distance between the second detector unit and the first geometric pattern is obtained by analyzing a detected size of each geometric pattern.

\* \* \* \* \*